United States Patent
Jaeckle et al.

(10) Patent No.: US 11,300,687 B2
(45) Date of Patent: Apr. 12, 2022

(54) DISCRIMINATING AND MITIGATING SNS SPOOFING SIGNALS

(71) Applicants: Thomas Howard Jaeckle, San Antonio, TX (US); Wayne D. Music, San Antonio, TX (US); Donald R. Van Rheeden, San Antonio, TX (US); Thomas Tillotson, Greenville, TX (US); Jeffery C. Sanders, Dallas, TX (US)

(72) Inventors: Thomas Howard Jaeckle, San Antonio, TX (US); Wayne D. Music, San Antonio, TX (US); Donald R. Van Rheeden, San Antonio, TX (US); Thomas Tillotson, Greenville, TX (US); Jeffery C. Sanders, Dallas, TX (US)

(73) Assignee: Southwest Research Institute, San Antonio, TX (US)

(*) Notice: Subject to any disclaimer, the term of this patent is extended or adjusted under 35 U.S.C. 154(b) by 234 days.

(21) Appl. No.: 16/846,350

(22) Filed: Apr. 12, 2020

(65) Prior Publication Data

US 2021/0318447 A1   Oct. 14, 2021

(51) Int. Cl.
*G01S 19/21* (2010.01)
*H04K 3/00* (2006.01)
*G01S 19/43* (2010.01)
*G01S 19/27* (2010.01)
*G01S 19/01* (2010.01)

(52) U.S. Cl.
CPC ............ *G01S 19/215* (2013.01); *H04K 3/224* (2013.01); *H04K 3/90* (2013.01); *G01S 19/015* (2013.01); *G01S 19/27* (2013.01); *G01S 19/43* (2013.01)

(58) Field of Classification Search
CPC ......... G01S 19/215; H04K 3/90; H04K 3/224
See application file for complete search history.

(56) References Cited

U.S. PATENT DOCUMENTS

| | | | | |
|---|---|---|---|---|
| 10,024,973 | B1 * | 7/2018 | Alexander | G01S 19/21 |
| 10,162,060 | B2 * | 12/2018 | Jaeckle | G01S 19/21 |
| 10,705,176 | B2 * | 7/2020 | Mesecher | H04B 7/0854 |
| 10,739,466 | B2 * | 8/2020 | Grobert | H04K 3/228 |
| 11,079,493 | B2 * | 8/2021 | Jaeckle | G01S 19/015 |

* cited by examiner

Primary Examiner — Gregory C. Issing
(74) Attorney, Agent, or Firm — Livingston Law Firm

(57) ABSTRACT

A system and method for discriminating and mitigating spoofing signals incoming to a satellite navigation system. Beam steering techniques are used to steer a null toward a legitimate satellite signal that is being spoofed. The spoofing signal is then tracked and its angle of arrival measured. A null is steered toward the measured angle of arrival of the spoofing signal, and the spoofing signal is confirmed by determining if there is a signal remaining with nulls on both the legitimate satellite signal and the spoofing signal. The null toward the legitimate satellite signal is then replaced with unity gain.

9 Claims, 4 Drawing Sheets

DISCRIMINATING AND MITIGATING SNS SPOOFING SIGNALS

TECHNICAL FIELD OF THE INVENTION

This invention relates to satellite navigation systems (SNS's), and more particularly, to discriminating between legitimate satellite signals and signals that are spoofing the legitimate satellite signals.

BACKGROUND OF THE INVENTION

Satellite navigation systems (SNS's) allow electronic receivers to determine their own location (longitude, latitude, and altitude) to within a few meters, using time signals transmitted along radio lines of sight from satellites. The signals also allow the receivers to calculate a current local time to high precision, which allows time synchronization.

A satellite navigation system with global coverage may be termed a global navigation satellite system (GNSS). Examples of GNSS's are the United States NAVSTAR Global Positioning System (GPS) and the Russian GLONASS. Other countries have or are in the process of developing global or regional navigation systems.

SNS's have three parts: the space segment, the user segment, and the control segment. The space segment consists of a number of satellites, each in its own orbit above the Earth. The user segment consists of receivers, which can be very small and can be either stationary or mobile. The control segment consists of ground stations that measure satellite orbits and maintain satellite-based time standards.

In operation, SNS satellites each broadcast a signal that contains the orbital parameters of the satellite and the time on board that satellite. The satellite uses a highly stable atomic clock as a master reference for its frequency generation and time keeping. An SNS receiver subtracts the time of broadcast encoded in the transmission from the time of reception, as measured by the receiver's internal clock. This difference, when multiplied by the speed of light, provides a range measurement between the satellite and the receiver. The SNS receiver's location and its clock offset from the time reference of the satellite are unknown but can be calculated from simultaneous range measurements to at least four satellites. The receiver also receives the orbital ephemeris for the satellites, which allows it to calculate the position of the satellite when the signal was transmitted. Once the positions of the satellites at the time of transmission are known, the location of the receiver and the receiver's clock offset may then be calculated.

SNS spoofing is a growing threat to the use of SNS systems. An SNS spoofing attack attempts to deceive an SNS receiver by broadcasting incorrect SNS signals structured to resemble a set of normal SNS signals, or by rebroadcasting genuine signals captured elsewhere or at a different time. The spoofing signals may cause the receiver to estimate its position to be somewhere other than where it actually is, or to be located where it is but at a different time.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, satellite signal spoofing is a threat to satellite navigation systems. U.S. Pat. No. 10,162,060, issued to T. Jaeckle, entitled "Determination of Integrity of Incoming Signals of Satellite Navigation System", describes a method of detecting spoofing signals. That patent is incorporated by reference herein. Research is ongoing, and other methods may be developed to detect spoofing signals.

The following description is directed to a method of using an antenna array (or groups of antenna elements of a larger array) to discriminate between spoofing signals and legitimate satellite signals. The antenna array allows measurement of the angle of arrival (AoA) of the spoofing signal, which allows mitigation efforts such as directing a null toward the spoofing signal to be effective. A "spoofing signal" is meant in a broad sense to mean any "unwanted" signal that may interfere with proper operation of the GNS signal by providing false GNS data.

For purposes of example, the following description is in terms of a GPS signal. However, the method is also applicable to other satellite navigation systems (SNS's) and their signals.

Figure 1:
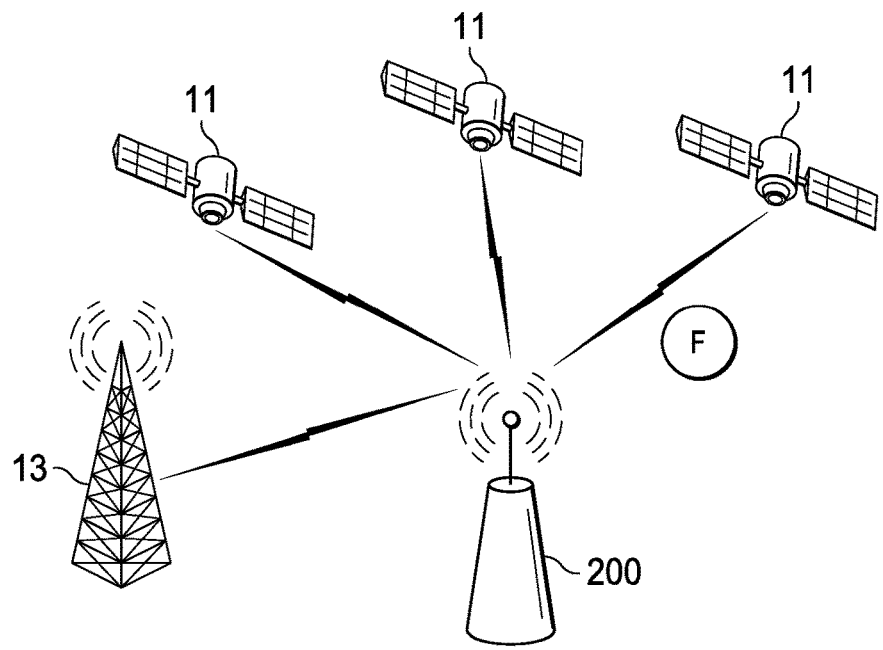
FIG. 1 illustrates a portion of a satellite navigation system and a spoofing signal source resulting in a false position reading.

FIG. 1 illustrates a portion of a GPS satellite navigation system. GPS satellites 11 transmit navigation signals visible to a GPS receiver system 200. Three legitimate GPS satellites 11 are shown; in practice, the receiver system 200 may receive signals from more GPS satellites. The receiver system is located at position X.

A spoofing transmitter 13 is transmitting signals that simulate GPS signals and are visible to the receiver system 200. Thus, FIG. 1 is an example of the context of the present invention. The spoofing transmitter 13 may be implemented with various schemes. For example, the spoofing signal could be a composite of several satellite signals.

The spoofing signal is designed to mimic the signal of a legitimate GPS satellite. As a result, the GPS receiver 200 is deceived into calculating its position to be at F rather than at X.

Although the spoofing transmitter 13 is shown as a stationary ground station, the method and system herein are not limited to this particular spoofing configuration. For example, the spoofer could be a mobile station, such as an aircraft, with the method and system being modified to compensate for movement of the spoofing transmitter.

The GPS system has a world-wide network of monitor and control stations (not shown) that continuously update position and clock estimates for each satellite 11. Each satellite 11 is equipped with an accurate clock and broadcasts signals coupled with a precise time message.

As is conventional, the GPS receiver system 200 receives satellite signals, each of which takes a measurable amount of time to reach the receiver. The difference between the time the signal is sent and the time it is received, multiplied by the speed of light, enables the GPS receiver to calculate the distance to the satellite. The distance measurement is made in a three-dimensional Cartesian coordinate system whose origin is at the center of the earth. Once the distance to the satellites is measured and the receiver's Cartesian coordinates are estimated, they can be converted into latitude, longitude, and altitude.

Receiver System

As stated above, the GPS scheme is predicated upon reception of signals within a line of sight of the GPS receiver 200. A signal can arrive from any azimuthal direction and from elevations from at the horizon to zenith. The ideal antenna receiving pattern for a GPS receiver is hemispherical, centered on the receiver antenna's zenith. For an antenna with a clear view of the sky, the signals received from a GPS satellite are plane waves arriving perpendicular to a line from the satellite to the receiver.

The GPS spoofing detection method described herein is implemented with a GPS receiver antenna array having multiple antenna elements, or possibly multiple arrays of antenna elements. Each of the array antenna elements is connected to a GPS receiver, and the received signal is synchronously down-converted to an intermediate frequency and digitized. The receiving equipment tracks all received signals synchronously and simultaneously.

Figure 2:
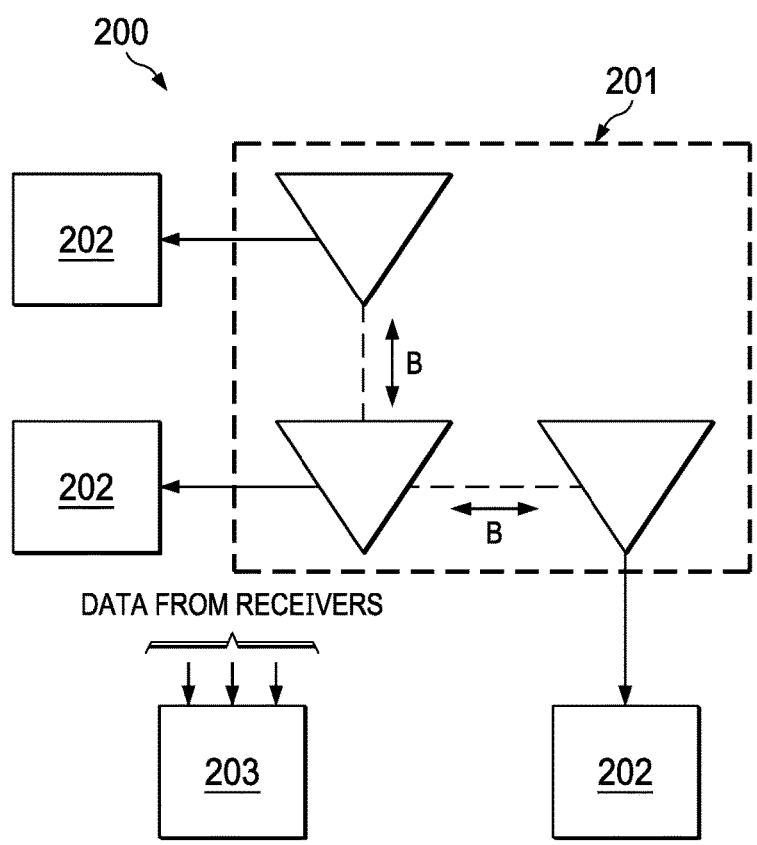
FIG. 2 illustrates a simplified receiver system for implementing the invention.

FIG. 2 illustrates an example of a receiver system 200 suitable for implementation of the methods described herein. The receiver system 200 comprises an array 201 of antenna elements, with each antenna element in communication with a receiver 202. The antenna elements in the array 201 may be implemented as a subarray of single antenna elements whose outputs are combined to provide a single output. In an alternative embodiment, each antenna element in a subarray can be connected to a receiver.

In the example of FIG. 2, the antenna elements are arranged along two orthogonal baselines. The orthogonal antenna element baselines share a common antenna element. Along each baseline are at least two or more antenna elements. In the simplified example of this description, there are three antenna element/receiver combinations. The two "end" antenna elements are separated from the common antenna element by a distance B.

Figure 2A:
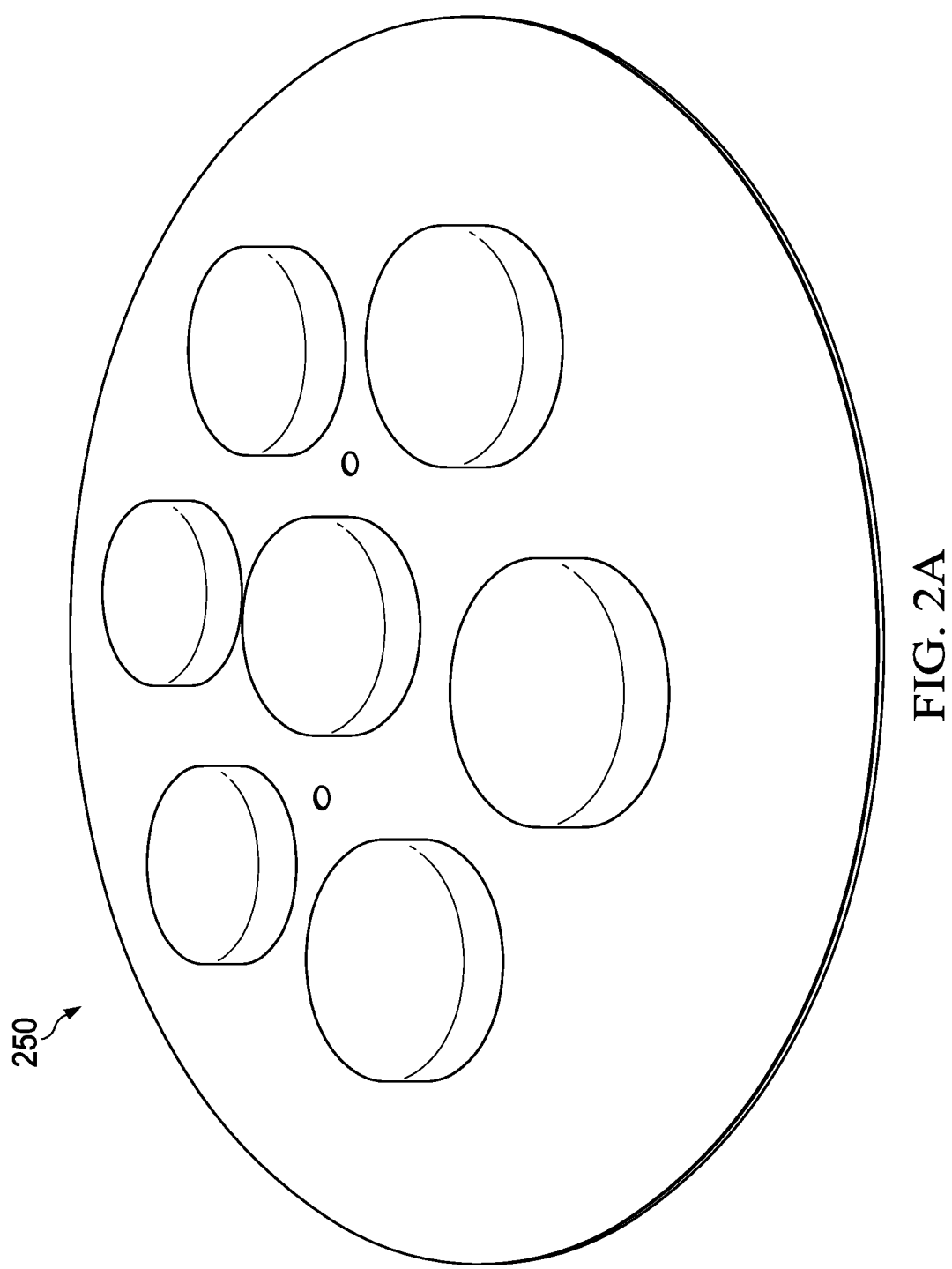
FIG. 2A illustrates an alternative antenna array for the receiver system of FIG. 2.

FIG. 2A illustrates another example of a suitable antenna array. Here, the antenna array is a controlled radiation pattern array 250, implemented as a planar uniform circular antenna array. Array 250 has seven antenna elements, with one element being a center reference element. Adjacent elements have a half-wavelength separation. Array 250 can be used as one of the subarrays of array 200 of FIG. 2 or can be used in some other array configuration.

There are a number of antenna array configurations suitable for the method described herein. Arrays of subarrays may be used.

The arrays may be planar or non-planar and may be orthogonal or circular. Examples of these array types are planar uniform circular arrays, non-planar uniform circular arrays, and orthogonal sub-arrays. For arrays operating in one frequency band, the arrays should have either have a half-wavelength between elements or a difference between elements in each orthogonal axis equal to a half-wavelength.

A suitable antenna array will be unambiguous in angle of arrival over 360 degrees azimuth and 180 degrees elevation angles. A common feature of the various embodiments of the receiver system is multiple antenna inputs and all receiver channels making measurements coherently.

A processing unit 203 receives data from the receivers 202 and has appropriate software and hardware for performing the processes described herein. It should be understood that division of various processing tasks described herein between the receivers 202 and processing unit 203 may be implemented in various ways not significant to the invention. It should be further understood that the receivers 202 may be any device having GPS receiving capability, and whatever hardware and/or software is appropriate to perform the tasks described herein, however divided between the receivers 202 and the processing unit 203.

As explained below in connection with FIG. 3, receivers 200 are programmed with adaptively constrained beam forming algorithms. An example of such algorithms is linearly constrained minimum variance (LCMV) algorithms. With this capability and programmed in the manner described below, receivers 200 are capable of unity gain in a look direction of choice and are capable of rejecting unwanted signals with null steering algorithms.

Receivers 200 are also programmed to perform angle of arrival measurement calculations. Antenna arrays such as those of FIG. 2 or 2A can be used to measure the angle of arrival of an incoming signal. A suitable method of using an antenna array to measure an angle of arrival in three dimensions (including elevation) is described in U.S. Pat. No. 10,162,060, referenced above.

For measuring the angle of arrival (both azimuth and elevation) of a spoofing signal with a null placed toward the satellite, at least three identical antenna arrays 201 and receivers 202 may be used.

Many algorithms exist, and many types of antenna arrays may be used, for measuring the angle of arrival of an incoming signal. For purposes of example in this description, orthogonal antenna arrays and carrier phase measurements are used, but the method is not limited to that approach to angle of arrival measurement.

Method of Discriminating and Mitigating Spoofing Signal

Figure 3:
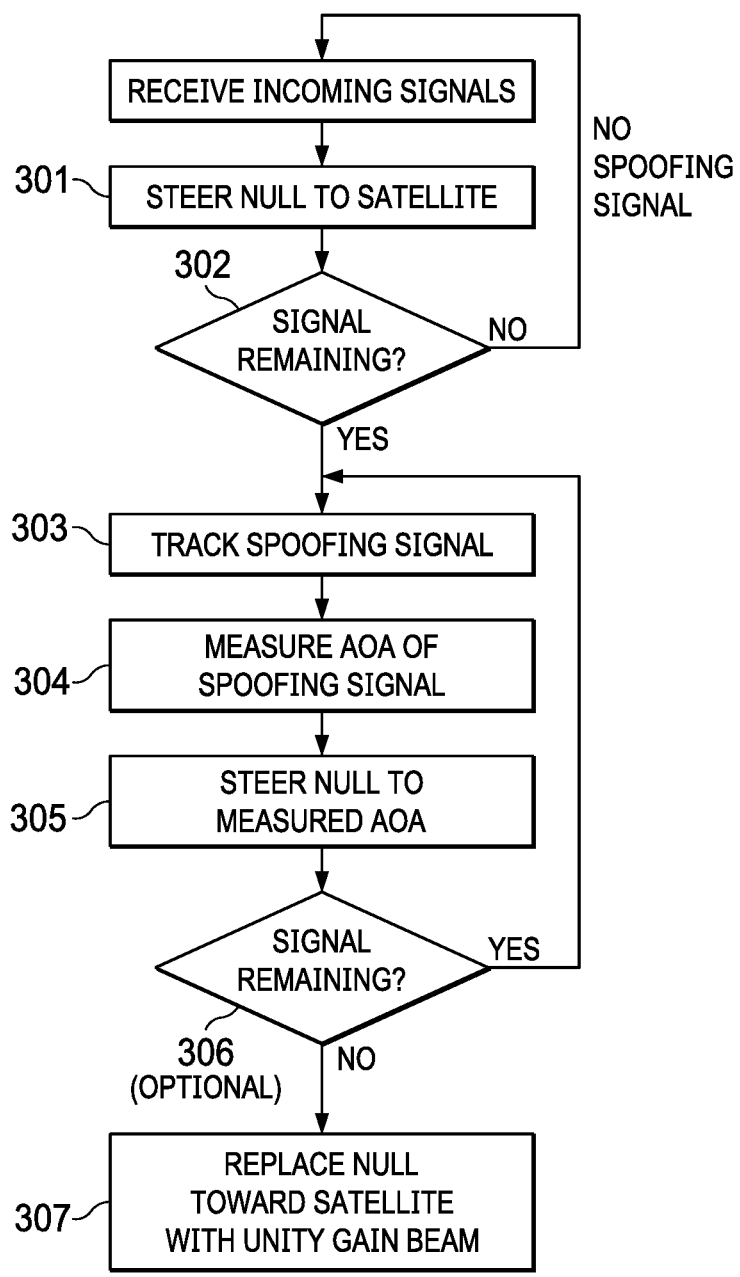
FIG. 3 illustrates a method of discriminating a spoofing signal in accordance with the invention.

FIG. 3 illustrates a method of discriminating and mitigating a spoofing signal from a legitimate satellite signal in accordance with the invention. It is assumed that a spoofing signal is suspected, but its angle of arrival is not known. A typical scenario might be when a receiver 202 is receiving two signals, one legitimate and the other a spoofing signal. The two incoming signals may appear to be identical in frequency and time. A phase locking receiver will have difficulty determining whether it is tracking a real satellite signal or a spoofing signal.

As explained above in connection with FIG. 1, a spoofing transmitter is not physically located in the same place as a satellite. Thus, the two signals can be differentiated by comparing the measured angle of arrival to the expected angle of arrival of the satellite signal. However, in some cases, the measured angle of arrival of the spoofing signal is not immediately measurable. And simply pointing a beam at the legitimate satellite does not guarantee tracking of a legitimate signal because beams tend to be rather broad.

In Step 301, a null is placed toward the legitimate satellite signal. In a GPS system, the location of the satellites is precisely known as a function of time. Specifically, each satellite transmits its ephemeris data as part of its signal. This data allows the receiver 200 to precisely determine the satellite's location at the time of reception of its signal at receiver 200. Knowledge of the satellite's location and the location of receiver 200 allows the three-dimensional angle of arrival (azimuth and elevation) of the satellite to be determined. Using nulling techniques, a null is steered toward the direction of the satellite.

Step 302 is determining if an incoming signal is remaining with the null of Step 301 in place. Detection of a persistent signal, while placing a pattern null in the direction of the satellite, is a confirmation of the presence of a spoofing signal.

Step 303 is tracking the spoofing signal. Once the signal from the satellite has been removed in Step 302 with the pattern null, the remaining constraints are placed so that the spoofing signal can be tracked.

Figure 4:
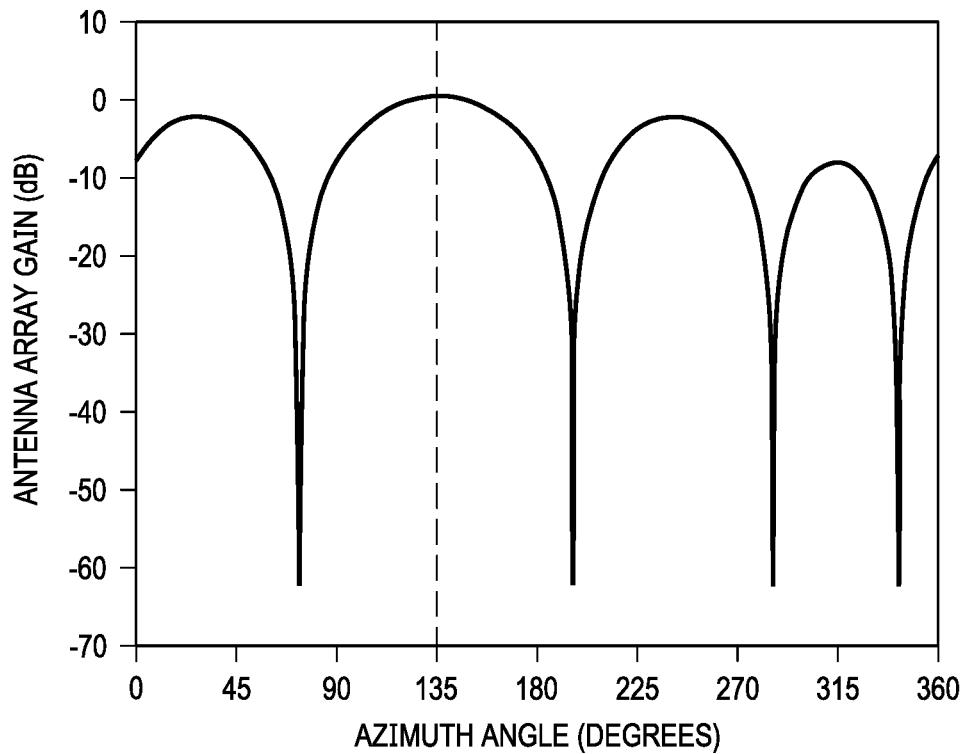
FIG. 4 illustrates an example of an adaptive beam pattern with unity gain at 135 degrees.
Figure 5:
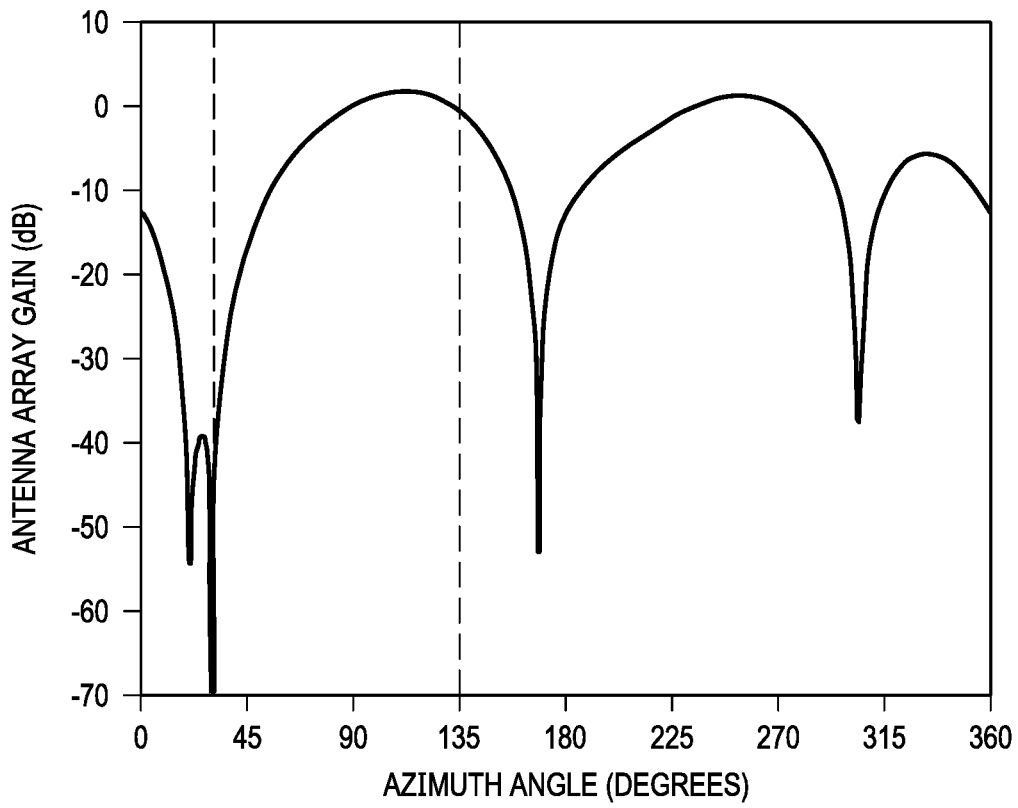
FIG. 5 illustrates an example of an adaptive beam pattern with unity gain at 135 degrees and nulling a signal at 30 degrees.

As illustrated in FIGS. 4 and 5, while the constraint for a pattern null is narrow and sharp, the unity gain constraint results in a pattern with a broader beam whose gain decreases more slowly compared to the pattern null. FIG. 4 illustrates an adaptive array beam pattern of a unity gain beam steered to azimuth 135 degrees with no other interferers. FIG. 5 illustrates an adaptive array beam pattern with unity gain beam steered to azimuth 135 degrees and simultaneously nulling a signal at azimuth 30 degrees. In FIGS. 4 and 5, azimuth beam patterns are illustrated, but unity gain steering and signal nulling can be generalized to two-dimensional azimuth and elevation beam patterns.

Referring again to FIG. 3, to perform Step 303, one approach to searching for the spoofer is to place the null in the direction of the satellite and unity gain in sectors. This can be accomplished by performing multiple beamforming algorithms simultaneously, each with the null toward the satellite and slightly different unity gain directions to maximize the spoofing signal.

Another approach is to operate iteratively by estimating the direction of arrival of one signal while suppressing all other signals by projection of nulls. Energy detection may be through the use of a generalized likelihood ratio test.

Once the spoofing signal has been spatially separated from the satellite signal and tracked in Step 303, Step 304 is measuring the angle of arrival of the spoofing signal. This is accomplished using antenna arrays such as those described above. For a given incoming signal, each antenna element receives that signal.

In the example of this description, where carrier phase measurements are used to measure the angle of arrival, each receiver measures the carrier phase of the signal at its associated antenna element. This measurement step includes removing the receiver clock bias and the initial phase ambiguity. The carrier phase differences between antenna elements are calculated.

For Step 304, the null remains steered to the satellite. This complicates measurement of different carrier phases between antenna elements of array 200 because the amplitude and phase response of each antenna element is being weighted to produce the null (which is realized by summing all of the weighted element signals).

However, differential phase carrier measurements can be made between the outputs of identical antenna arrays 200. For example, using orthogonal arrays such as shown in FIG. 2, three arrays are sampled simultaneously, each one having a null steered toward the satellite. The antenna elements of each array are separated by a distance B, and the array phase centers are similarly separated by a distance B' so that they become an array of arrays.

The use of multiple antenna arrays allow measurement of the AoA in both azimuth and elevation. The array outputs are vector summed into a single output that exhibits the beam pattern determined by the weights placed on the output signals. Using three arrays, there are three such outputs, which are then coherently mixed back up to the GPS frequency. These three outputs can then be used to measure the differential carrier phase of the signal tracked when the nulls are steered at the specific satellite position. The weights are applied to each element of each array, and those weights will null the signals in the direction of one satellite signal, but a carrier phase difference between those signals should be measurable to obtain the AoA.

Thus, the carrier phase differences and knowledge of the spatial relationship of the antenna elements and of the antenna arrays provides the information required to determine the three-dimensional (angle and elevation) angle of arrival of the spoofing signal.

Step 305 is steering a null in the direction determined in Step 304, i.e., in the direction of the spoofing transmitter.

Step 306 is an optional testing step, in which it is determined if there is a signal remaining with nulls on both the satellite and the spoofing transmitter. If no signal remains, it can be assumed that the spoofing signal has been nulled.

Step 307 is replacing the null towards the satellite with a unity gain beam toward the satellite. The null on the spoofing signal is kept, and the spoofing signal is thereby mitigated. The satellite signal can now be tracked and used for its desired GPS application (location, timing, etc.).

Measuring Angle of Arrival with Differential Phase Measurements

As stated above, to measure the angle of arrival of a signal source, each antenna element makes measurements on the same signal. This may be accomplished by using a receiver connected to each antenna element that simultaneously (and continuously) makes measurements on all tracked signals. Each of these receivers is synchronized with all other receivers. The result is a composite receiver system, which is a massively parallel device with multiple antenna inputs and all channels making measurements coherently.

One approach to determining angle of arrival is to start with the measured time of arrival at each receiver 202, and to use a conventional GPS distance measurement on the code phase. The code phase chips at a 1.023 MHz rate, so one chip of the code is 292 meters long (speed of light/1.023 MHz). Measurement can be made to about 0.1% of that distance, so the resolution is 292 meters/1000, or 0.292 meters. The distance measurements and the spatial relationship of the antennas could be used with a geometric algorithm to determine the angle of arrival of the signal source.

However, for purposes of the GPS spoofer detection method described herein, a more precise measurement can be obtained by counting cycles of the carrier wave. The frequency of civilian GPS is 1575420000 Hz. The wavelength of the carrier wave at that frequency is 0.19029 meters. Using carrier phase measurements, distance can be measured to fractions of a wavelength. These distance measurements using carrier phase are more accurate, but are for relative distance measurements, not absolute measurements.

The measurement of the angle of arrival based on carrier phase measurements allows for an antenna array geometry with antenna elements spaced a practical distance apart. For example, using the array of FIG. 2, a suitable antenna array might have the antenna elements spaced approximately 20 centimeters apart. The measurement of the angle of arrival of the incident plane wave is accomplished by coherently measuring the signal carrier phase at each antenna element. These carrier phase measurements are biased by fixed constant offsets, which must be removed. If the carrier phase is reported by the receivers at exactly the same time, the difference between these carrier phase measurements will also have a constant but unknown offset, which is the difference between the offsets of the individual biases. However, these biases can be determined because the difference between the observed carrier phases at each antenna element equals the difference in range between the satellite and the receive antennas and the difference between the individual received signal constant biases. A priori knowledge of the distance between the antennas and the orientation of the antennas relative to each other permits calculation of the difference in ranges between these antennas for a signal arriving from any azimuth and from any elevation up to near zenith.

Once the carrier phase differences between antenna elements are known, an angle of arrival can be calculated. Because the distance between antenna elements is known, an arctangent algorithm may be used to compute the angle of arrival.

Using the antenna array of FIG. 2 as an example, to perform the arctangent algorithm, the receiver system 200 has an antenna array 201 with at least three antenna elements. In this example, the three antenna elements form orthogonal baselines aligned North-South (NS) and East-West (EW) with a spacing of B meters between the north and the corner and between the east element and the corner, as measured in the plane of the antennas. These antenna elements form a local East-North-Up coordinate system. If the satellite (or other signal source) is in the plane of the antennas and aligned along the NS baseline, the difference between the carrier phase measured between the North antenna and the corner would be B meters. The difference between the carrier phase measured between East antenna and the corner would be 0. Likewise, if the satellite were aligned with the EW baseline, and in the plane of the antennas, the carrier phase difference on the EW baseline would be B and the NS baseline would be 0.

With the satellite in the plane of the antennas and assuming any angle, as measured clockwise from the NS baseline, the carrier phase difference measured along these baselines would be:

$$NS = -B*\cos(\text{angle})$$

$$EW = -B*\sin(\text{angle})$$

Measuring the angle moving clockwise relative to a NS baseline is the definition of azimuth. Hence the baseline carrier phase differences, in the plane of the antennas, are:

$$NS = -B*\cos(\text{azimuth})$$

$$EW = -B*\sin(\text{azimuth})$$

In practice, satellite signals are not usable in the plane of the antenna. But when the satellite is at some elevation angle measured between the plane of the antennas moving toward zenith, the signals are useful, but the carrier phase difference measurements are shortened by the cos(elevation). Hence, the general expression for the carrier phase differences along the baselines for a satellite at azimuth, az, and elevation, el, is $$NS = -B*\cos(az)*\cos(el)$$

$$EW = -B*\sin(az)*\cos(el)$$

These are the projections onto the baselines for a signal arriving from an azimuth, az, and an elevation, el.

With the carrier phase measurements and their differences having been determined, i.e., (North-Corner) for the NS and (East-Corner) for EW, and B is known, the azimuth and elevation for that satellite signal can be calculated. The ratio of the carrier phase difference EW to NS is the tangent of the angle az, or $$az = \arctan(EW/NS),$$

except at + and −90 degrees, where the ratio is undefined.

It should also be noted that there are two possible solutions for the ratio of EW/NS. Depending upon the signs of NS and EW, there is an ambiguity of 180 degrees. However, when measuring the difference in carrier phase between the end antennas elements and the corner, the corner antenna element is used as a reference, so when the satellite is coming from an azimuth between 90 and 270 degrees, the difference will always be negative. The ambiguity is resolved by the sign of the NS quantity and the EW quantity to decide what quadrant and angle to use.

Calculating elevation becomes problematic as the elevation angle approaches 90 degrees. At zenith, there is no difference between the carrier phase measurements between any of the antenna elements. In other words, as the elevation angle approaches 90 degrees, the projection on the baselines becomes shorter and shorter until they become smaller than the measurement resolution and go to zero when the signal arrives from the direction perpendicular to the plane of the antennas. This situation can be resolved by an additional antenna element (and receiver) not in the plane of the other antenna elements.

To determine the elevation angle, the ratio of the projection of the ray to the satellite upon the antenna plane and the baseline spacing is calculated. The baseline spacing, B, is known precisely. So, the elevation angle is given by:

$$\text{elevation angle} = \arccos(\text{sqrt}((NS)^2 + (EW)^2)/B)$$

What is claimed is:

1. A method of discriminating a spoofing signal from a legitimate satellite signal of a satellite navigation system, comprising:
   steering a null toward the legitimate satellite signal;
   detecting the spoofing signal by determining if an incoming signal remains with the null steered toward the legitimate satellite signal;
   tracking the spoofing signal, with the null remaining on the legitimate satellite signal;
   measuring the angle of arrival of the spoofing signal, with the null remaining on the legitimate satellite signal;
   removing the null on the legitimate satellite signal;
   steering a null in the direction of the angle of arrival of the spoofing signal; and
   placing a unity gain beam toward the legitimate satellite signal.

2. The method of claim 1, wherein the satellite navigation system is a global positioning system.

3. The method of claim 1, wherein the step of steering a null toward the legitimate satellite signal is performed by using ephemerides data of the legitimate satellite signal.

4. The method of claim 1, wherein the step of tracking the spoofing signal is performed by placing unity gain in sectors.

5. The method of claim 1, wherein the step of tracking the spoofing signal is performed by estimating a direction of arrival of the spoofing signal while placing nulls on all other incoming signals.

6. The method of claim 1, wherein the step of measuring the angle of arrival of the spoofing signal is performed with an orthogonal antenna array.

7. The method of claim 1, wherein the step of measuring the angle of arrival of the spoofing signal is performed with a circular antenna array.

8. The method of claim 1, wherein the step of measuring the angle of arrival of the spoofing signal is performed using carrier phase measurements.

9. The method of claim 1, wherein the step of removing the null on the legitimate satellite signal is preceded by determining if there is a signal remaining with nulls on both the legitimate satellite signal and the spoofing signal.

\* \* \* \* \*